(12) United States Patent
Matsuo et al.

(10) Patent No.: US 8,108,440 B2
(45) Date of Patent: Jan. 31, 2012

(54) FILE SERVER AND FILE MANAGEMENT METHOD

(75) Inventors: Toshiaki Matsuo, Yokohama (JP);
Nobuo Beniyama, Yokohama (JP);
Takato Kusama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 12/385,537

(22) Filed: Apr. 10, 2009

(65) Prior Publication Data

US 2010/0199035 A1 Aug. 5, 2010

(30) Foreign Application Priority Data

Jan. 30, 2009 (JP) ................. 2009-019839

(51) Int. Cl.
*G06F 7/00* (2006.01)
(52) U.S. Cl. ...................................... 707/802
(58) Field of Classification Search .................. 707/802, 707/812
See application file for complete search history.

(56) References Cited

U.S. PATENT DOCUMENTS

2009/0164822 A1* 6/2009 Yasui et al. .................... 713/324

FOREIGN PATENT DOCUMENTS

JP 2003-085871 9/2001
JP 2003-085871 * 3/2003

* cited by examiner

*Primary Examiner* — Angela Lie
(74) *Attorney, Agent, or Firm* — Stites & Harbison PLLC; Juan Carlos A. Marquez, Esq.

(57) ABSTRACT

A file server achieving sufficient power-saving effect is provided. The file server is capable of operating an on-line storage medium (in a state in which reading/writing can be started immediately in response to a file read/write request) and an off-line storage medium (which has to be started up upon receiving a read/write request). Upon reception of a stream file write request, the file server's processing unit acquires bit rate information from the stream file, calculates the file's splitting position from the bit rate information and startup time of the off-line storage medium, and stores a first part (up to the splitting position) in the on-line storage medium while storing the remaining second part in the off-line storage medium. Upon reception of a stream file read request, the processing unit reads out the first part while starting up the off-line storage medium and reading out the second part.

14 Claims, 14 Drawing Sheets

130 FILE SPLIT ARRANGEMENT POLICY DEFINITION TABLE

| 131 EXTENSION NAME | 132 STORING DEVICE LAYER NAME | 133 SPLIT ARRANGEMENT PROGRAM NAME | 134 CHAPTER SPLIT ARRANGEMENT NECESSITY | 135 INDEX ON-LINE SPLITTING NECESSITY | 136 SAFETY COEFFICIENT (FOR SEGMENT SIZE CALCULATION) | 137 READ/WRITE FREQUENCY UPPER THRESHOLD | 138 READ/WRITE FREQUENCY LOWER THRESHOLD | |
|---|---|---|---|---|---|---|---|---|
| mpg | SPIN DOWN LAYER | FOR MPEG | NECESSARY | UNNECESSARY | 1.125 | 100 TIMES/DAY | 50 TIMES/DAY | ~139 |
| mpg | SPIN OFF LAYER | FOR MPEG | NECESSARY | UNNECESSARY | 1.250 | 50 TIMES/DAY | 20 TIMES/DAY | |
| mpg | POWER-OFF MAGNETIC DISK LAYER | FOR MPEG | NECESSARY | UNNECESSARY | 1.300 | 20 TIMES/DAY | 10 TIMES/DAY | |
| mpg | OPTICAL DISK LAYER | FOR MPEG | NECESSARY | UNNECESSARY | 1.300 | 10 TIMES/DAY | 5 TIMES/DAY | |
| mpg | MAGNETIC TAPE LAYER | FOR MPEG | NECESSARY | UNNECESSARY | 1.500 | 5 TIMES/DAY | 0 TIMES/DAY | |
| ⋮ | ⋮ | ⋮ | ⋮ | ⋮ | ⋮ | ⋮ | ⋮ | |

FIG.5

180 FILE SPLIT ARRANGEMENT NECESSITY DEFINITION TABLE

| EXTENSION NAME (181) | SPLIT ARRANGEMENT NECESSITY (182) | DEFAULT LAYER (183) |
|---|---|---|
| mpg | NECESSARY | SPIN OFF LAYER |
| wmv | NECESSARY | SPIN OFF LAYER |
| exe | UNNECESSARY | |
| txt | UNNECESSARY | |
| ⋮ | ⋮ | ⋮ |

FIG.6

130 FILE SPLIT ARRANGEMENT POLICY DEFINITION TABLE

| 131 | 132 | 133 | 134 | 135 | 136 | 137 | 138 |
|---|---|---|---|---|---|---|---|
| EXTENSION NAME | STORING DEVICE LAYER NAME | SPLIT ARRANGEMENT PROGRAM NAME | CHAPTER SPLIT ARRANGEMENT NECESSITY | INDEX ON-LINE SPLITTING NECESSITY | SAFETY COEFFICIENT (FOR SEGMENT SIZE CALCULATION) | READ/WRITE FREQUENCY UPPER THRESHOLD | READ/WRITE FREQUENCY LOWER THRESHOLD ~139 |
| mpg | SPIN DOWN LAYER | FOR MPEG | NECESSARY | UNNECESSARY | 1.125 | 100 TIMES/DAY | 50 TIMES/DAY |
| mpg | SPIN OFF LAYER | FOR MPEG | NECESSARY | UNNECESSARY | 1.250 | 50 TIMES/DAY | 20 TIMES/DAY |
| mpg | POWER-OFF MAGNETIC DISK LAYER | FOR MPEG | NECESSARY | UNNECESSARY | 1.300 | 20 TIMES/DAY | 10 TIMES/DAY |
| mpg | OPTICAL DISK LAYER | FOR MPEG | NECESSARY | UNNECESSARY | 1.300 | 10 TIMES/DAY | 5 TIMES/DAY |
| mpg | MAGNETIC TAPE LAYER | FOR MPEG | NECESSARY | UNNECESSARY | 1.500 | 5 TIMES/DAY | 0 TIMES/DAY |
| ... | ... | ... | ... | ... | ... | ... | ... |

170 LAYER STARTUP PERFORMANCE TABLE

| LAYER NAME | STARTUP TIME |
|---|---|
| SPIN DOWN LAYER | 5 SEC |
| SPIN OFF LAYER | 10 SEC |
| POWER - OFF MAGNETIC DISK LAYE | 30 SEC |
| OPTICAL DISK LAYER | 60 SEC |
| MAGNETIC TAPE LAYER | 100 SEC |

140 FILE SPLIT STORAGE STATUS MANAGEMENT TABLE

| 141 | 142 | 143 | 144 | 145 | 149 | 146 | 147 | 148 |
|---|---|---|---|---|---|---|---|---|
| PATH NAME | FILE NAME | FILE SEGMENT NUMBER | STARTING ADDRESS | ENDING ADDRESS | STORING LAYER NAME | STORING DEVICE NAME | STORING MEDIUM NUMBER | STORAGE LOCATION ADDRESS |
| /ast | comets.mpg | 1 | 0 | 1441791 | ON-LINE LAYER | 3 | 7 | 4718592 |
| /ast | comets.mpg | 2 | 1441792 | 52559871 | SPIN OFF LAYER | 42 | 2 | 0 |
| /ast | comets.mpg | 3 | 52559872 | 53870591 | ON-LINE LAYER | 3 | 7 | 6160384 |
| /ast | comets.mpg | 4 | 53870592 | 84017152 | SPIN OFF LAYER | 42 | 2 | 51118080 |
| /phy | quarks.mpg | 1 | 0 | 73400320 | ON-LINE LAYER | 5 | 4 | 17825792 |
| ... | ... | ... | ... | ... | ... | ... | ... | ... |

FIG.9

190 FILE READ/WRITE COUNT MANAGEMENT TABLE

| PATH NAME (191) | FILE NAME (192) | READ/WRITE COUNT (193) |
|---|---|---|
| /ast | comets.mpg | 30 TIMES |
| /phy | quarks.mpg | 150 TIMES |
| ⋮ | ⋮ | ⋮ |

FILE SERVER AND FILE MANAGEMENT METHOD

INCORPORATION BY REFERENCE

The present application claims priority from Japanese application JP 2009-019839 filed on Jan. 30, 2009, the content of which is hereby incorporated by reference into this application.

BACKGROUND OF THE INVENTION

The present invention relates to methods for a file server (e.g. NAS (Network Attached Storage)) for arranging data in storage devices and controlling power management of storage media in the storage devices.

In recent years, there are an increasing number of services supplying stream content (e.g. video) to user terminals via the Internet (hereinafter referred to as "streaming services") and a wide variety of content is handled by such services. In an on-line movie delivery service, for example, delivering a great number of movies to the users (irrespective of whether each movie is popular or not) has become important in order to precisely meet the preferences of each user. Further, with the increase in services letting users freely register videos shot by themselves and share such registered videos, the diversity and capacity of content are increasing with accelerating speed.

Meanwhile, with the increasing ground swell toward global environmental protection, more and more efforts are being made also in the information technology industry to reduce electric power consumption of devices. For storage devices, the technology called "MAID" (Massive Array of Inactive Disks), which makes it possible to individually start/stop each hard disk of a device having a large number of hard disks, is attracting great attention.

In the streaming service, an item of stream content is read out from a storage device and supplied on demand to the user requesting the content. Also for such streaming services, methods for reducing the power consumption of a storage device by employing MAID are being examined.

For example, a technique for reducing the power consumption of a storage device without deteriorating its quick response to content playback requests has been disclosed in JP-A-2003-85871. In the technique, an item of content is split into multiple parts and stored in separate hard disks. The hard disks storing the parts of the content are successively started up in sync with the playback of the content.

SUMMARY OF THE INVENTION

However, the technique disclosed in JP-A-2003-85871 (in which the timing for successively starting up the hard disks is controlled uniformly for every file being managed) involves a disadvantage of being unusable when files in different formats are coexisting. Especially when multiple items of stream content differing in the bit rate are coexisting, the timing of the successive startup of the hard disks tends to be inappropriate.

Further, it is difficult to achieve sufficient power-saving effect with the above technique (JP-A-2003-85871) which employs only one power-saving technology (stopping the revolution of each hard disk (spin off)) without considering other possible power-saving technologies (reducing the revolution speed of each hard disk (spin down), using optical disk devices, using magnetic tape devices, etc.).

The primary object of the present invention, which has been made to resolve the above problems, is to provide a file server and a file management method capable of achieving sufficient power-saving effect by effectively employing multiple power-saving technologies in a service handling a large amount of stream content in a variety of formats.

In accordance with an aspect of the present invention, there is provided a file server capable of operating an on-line storage medium in a state in which reading or writing can be started immediately in response to a read request or write request for reading/writing a file (e.g. hard disk 210 in an on-line layer 510) and an off-line storage medium which has to be started up upon the occurrence of the read request or write request (e.g. hard disk 210, optical disk 310 or magnetic tape 410 in an off-line layer 580). The file server comprises a storage unit which prestores at least startup time of the off-line storage medium and a processing unit which executes processing in response to requests. The processing unit receiving a write request for writing a stream file acquires bit rate information included in the stream file, calculates a splitting position of the file based on the acquired bit rate information and the startup time of the off-line storage medium, and executes split arrangement of the file by storing a first part as a part of the file in the on-line storage medium while storing a second part as the remaining part of the file in the off-line storage medium based on the splitting position. The processing unit receiving a read request for reading out the stream file reads out the first part from the on-line storage medium while starting up the off-line storage medium storing the second part and reading out the second part from the off-line storage medium.

By the present invention, sufficient power-saving effect can be achieved in a service handling a large amount of stream content in a variety of formats.

Other objects, features and advantages of the invention will become apparent from the following description of the embodiments of the invention taken in conjunction with accompanying drawings.

BRIEF DESCRIPTION OF THE DRAWINGS

FIG. 5 is a table showing data stored in a file split arrangement necessity definition table of the database.

FIG. 6 is a table showing data stored in a file split arrangement policy definition table of the database.

FIG. 8 is a table showing data stored in a file split storage status management table of the database.

FIG. 9 is a table showing data stored in a file read/write count management table of the database.

DETAILED DESCRIPTION OF THE EMBODIMENTS

Figure 1:
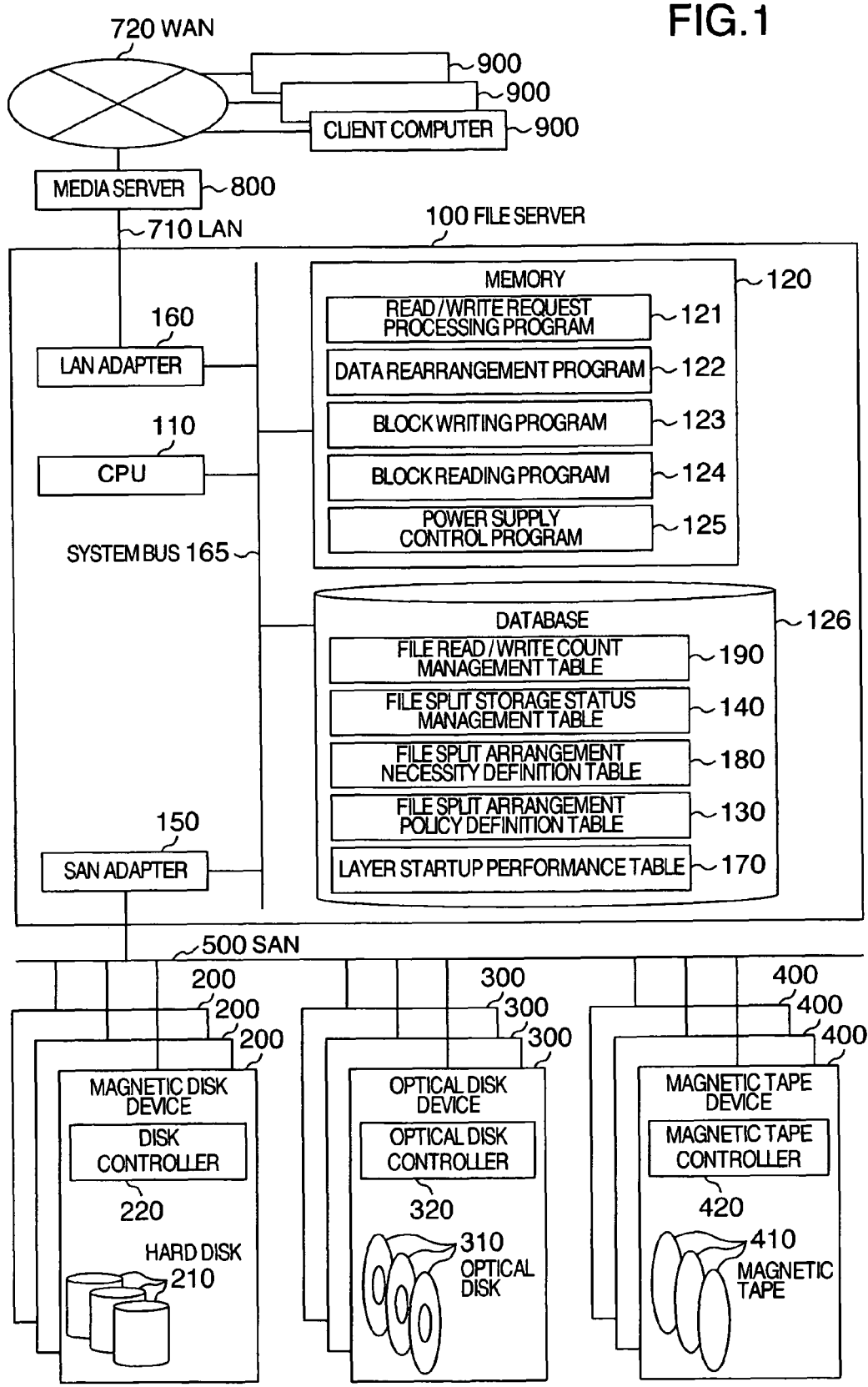
FIG. 1 is a block diagram showing the configuration of a system in accordance with an embodiment of the present invention.

Referring now to the drawings, a description will be given in detail of an embodiment in accordance with the present invention.

FIG. 1 is a block diagram showing the configuration of a system in accordance with an embodiment of the present invention. The system of the embodiment includes a file server 100, magnetic disk devices 200, optical disk devices 300, magnetic tape devices 400, a media server 800, client computers 900, a SAN (Storage Area Network) 500, a LAN (Local Area Network) 710 and a WAN (Wide Area Network) 720. The magnetic disk devices 200, the optical disk devices 300 and the magnetic tape devices 400 are connected to the file server 100 via the SAN 500 and a SAN adapter 150. The file server 100 is connected to the media server 800 via a LAN adapter 160 and the LAN 710. The media server 800 is connected to the client computers 900 via the WAN 720.

A plurality of stream files 600 (explained later, see FIG. 3) are stored in the magnetic disk devices 200, the optical disk devices 300 and the magnetic tape devices 400 which are connected to the file server 100. The stream files 600 stored in the devices 200, 300 and 400 are delivered on demand to the client computers 900 via the media server 800. The delivery of the stream files 600 by the media server 800 can be implemented with conventional techniques, and thus the following explanation will be given focusing on the configuration and operation inside the file server 100.

The file server 100 includes a CPU (Central Processing Unit) 110 (processing unit), a memory 120, a database 126 (storage unit), the SAN adapter 150, the LAN adapter 160 and a system bus 165. The CPU 110, the memory 120, the database 126, the SAN adapter 150 and the LAN adapter 160 are connected together by the system bus 165.

The memory 120 of the file server 100 stores a read/write request processing program 121, a data rearrangement program 122, a block writing program 123, a block reading program 124 and a power supply control program 125. The details of the programs 121, 122, 123, 124 and 125, which are executed by the CPU 110, will be explained later referring to FIG. 4.

Figure 7:
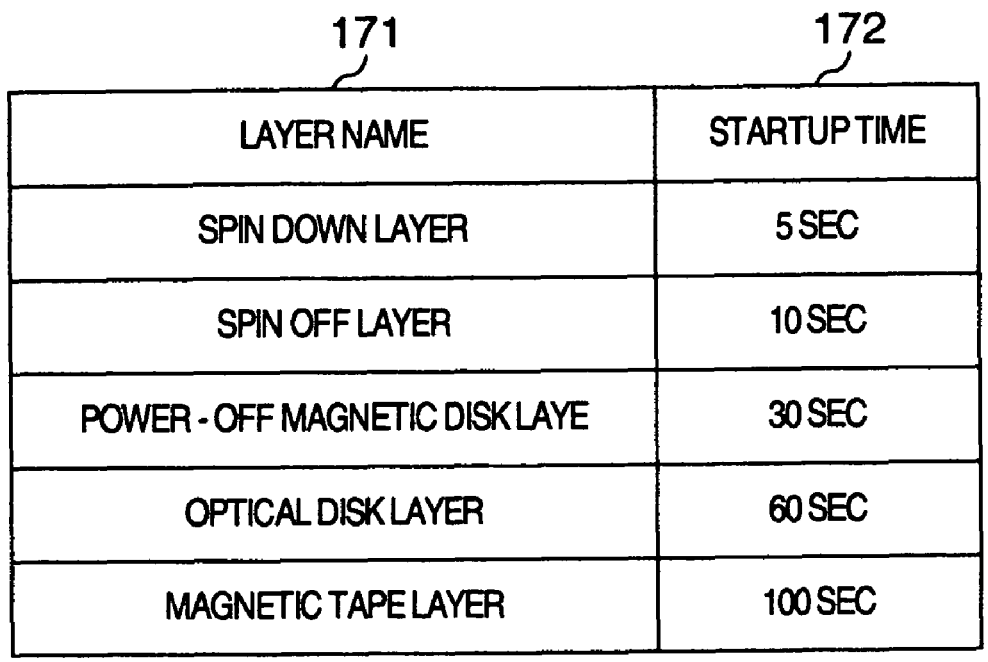
FIG. 7 is a table showing data stored in a layer startup performance table of the database.

The database 126 of the file server 100 stores a file split arrangement necessity definition table 180 (file split arrangement necessity information) (see FIG. 5), a file split arrangement policy definition table 130 (file split arrangement layer information) (see FIG. 6), a file read/write count management table 190 (see FIG. 9), a file split storage status management-table 140 (see FIG. 8) and a layer startup performance table 170 (layer startup performance information) (see FIG. 7). The definition tables, management tables and performance table stored in the database 126 will be explained later referring to FIGS. 4-9.

Each magnetic disk device 200 includes a disk controller 220 and a plurality of hard disks 210. The disk controller 220, having a read/write function and a power control function for the hard disks 210, executes processes according to commands received from the file server 100 via the SAN 500.

Each optical disk device 300 includes an optical disk controller 320 and a plurality of optical disks 310. The optical disk controller 320, having a read/write function and a power control function for the optical disks 310, executes processes according to commands received from the file server 100 via the SAN 500.

Each magnetic tape device 400 includes a magnetic tape controller 420 and a plurality of magnetic tapes 410. The magnetic tape controller 420, having a read/write function and a power control function for the magnetic tapes 410, executes processes according to commands received from the file server 100 via the SAN 500.

Next, the power control functions of the disk controller 220, the optical disk controller 320 and the magnetic tape controller 420 will be explained concretely.

The power control function of the disk controller 220 of each magnetic disk device 200 includes a function of controlling power supply status (ON/OFF) of the whole magnetic disk device 200 and a function of controlling power supply status of each hard disk 210. The power supply status of each hard disk 210 can be selected from three states: an on-line state, a spin down state (low revolution state) and a spin off state (stopped revolution state).

The electric power consumption of each hard disk 210 is the minimum in the spin off state and increases as the hard disk 210 shifts to the spin down state and to the on-line state. On the other hand, the reaction time of each hard disk 210 in response to a read/write command is the shortest in the on-line state and increases as the hard disk 210 shifts to the spin down state and to the spin off state. Since reading/writing from/to a hard disk 210 can not be started immediately when the hard disk 210 is in the spin down state or in the spin off state, the hard disk 210 has to be shifted to the on-line state before the execution of reading/writing. The transition time from the spin down state to the on-line state is shorter than that from the spin off state to the on-line state.

The power control function of the optical disk controller 320 of each optical disk device 300 is a function of controlling power supply status (ON/OFF) of the whole optical disk device 300. The power control function of the magnetic tape controller 420 of each magnetic tape device 400 is a function of controlling power supply status (ON/OFF) of the whole magnetic tape device 400.

Figure 2:
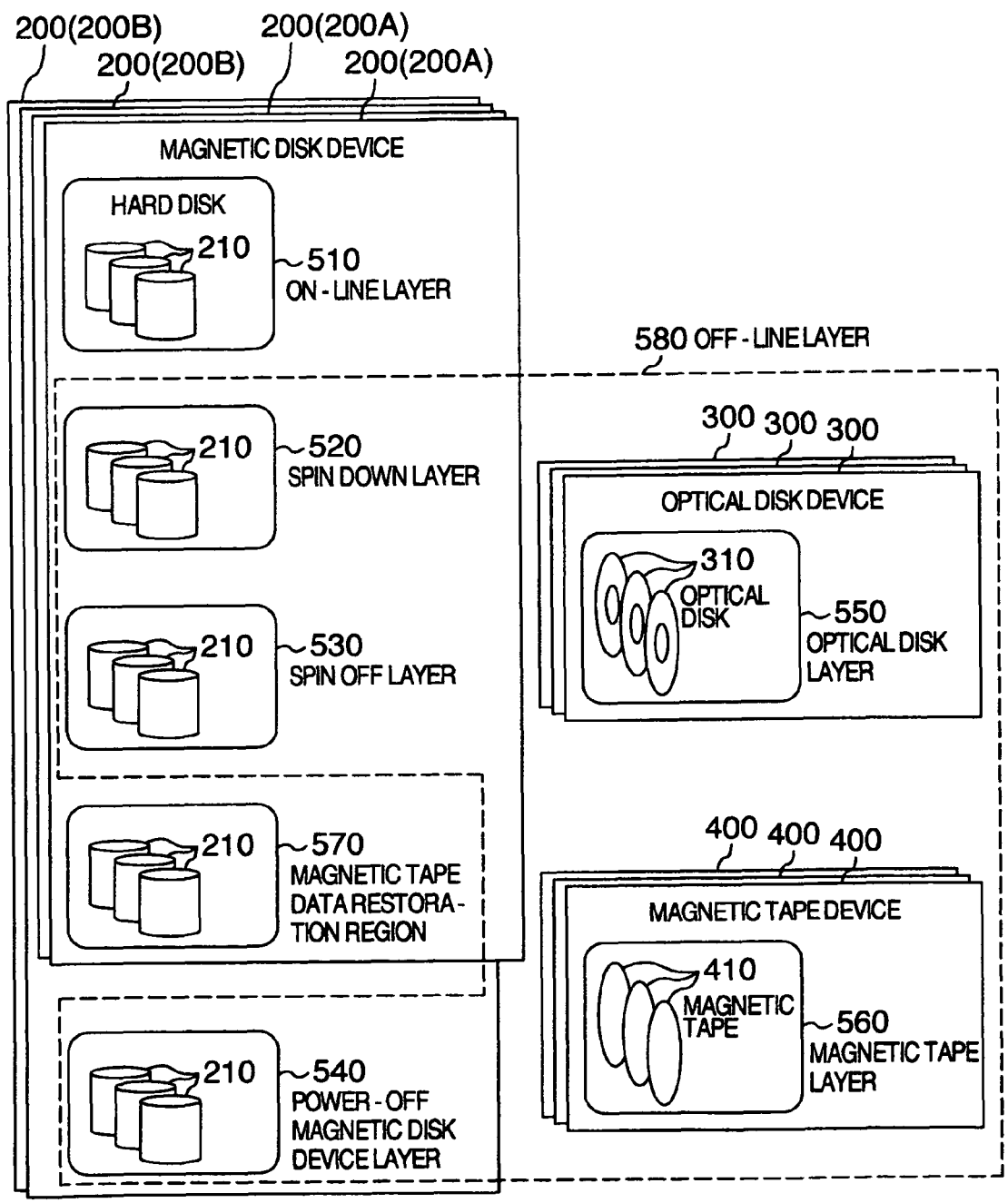
FIG. 2 is a schematic diagram showing hierarchical structure (layered structure) of storage media employed in the embodiment.

FIG. 2 is a schematic diagram showing hierarchical structure (layered structure) of storage media employed in this embodiment. In this embodiment, the hard disks 210, the optical disks 310 and the magnetic tapes 410 will be collectively referred to as "storage media". The layers shown in FIG. 2 mean classification of the storage media based on their types and power control settings. The layered structure is employed in this embodiment for properly using the storage media depending on the type and read/write frequency of each piece of data to be stored.

In the following explanation, a term "off-line layer 580" will be used to collectively mean layers (spin down layer 520, spin off layer 530, power-off magnetic disk device layer 540, optical disk layer 550 and magnetic tape layer 560) other than an on-line layer 510.

The magnetic disk devices 200 can be classified into two groups (200A, 200B) in different layers. In each magnetic disk device 200 (200A) belonging to a first group, the hard disks 210 inside the magnetic disk device 200A can be classified into the on-line layer 510, the spin down layer 520, the spin off layer 530 and a magnetic tape data restoration region 570. In the on-line layer 510, the spin down layer 520 or the spin off layer 530, the power supply of the whole device is constantly set in the ON state, and the power supply status of each hard disk 210 in its standby state is set in the on-line state, in the spin down state or in the spin off state. The magnetic tape data restoration region 570 is a region for temporarily storing data read out from the magnetic tapes 410. In the magnetic tape data restoration region 570, the power supply status of each hard disk 210 in its standby state is set in the on-line state.

In each magnetic disk device 200 (200B) belonging to a second group, the whole device (i.e. every hard disk 210 inside the magnetic disk device 200B) is in the power-off magnetic disk device layer 540. In the power-off magnetic disk device layer 540, the power supply of the whole magnetic disk device 200 is set at OFF in the standby state.

Each optical disk device 300 belongs to the optical disk layer 550. In the optical disk layer 550, the power supply of the whole optical disk device 300 is set at OFF in the standby state.

Each magnetic tape device 400 belongs to the magnetic tape layer 560. In the magnetic tape layer 560, the power supply of the whole magnetic tape device 400 is set at OFF in the standby state. Data reading from the magnetic tape layer 560 is carried out by first restoring the contents of a specified magnetic tape 410 (as the target of the data reading) in the magnetic tape data restoration region 570.

The on-line layer 510 and the off-line layer 580 can be translated as a layer that is made up of "on-line storage media" and a layer that is made up of "off-line storage media", respectively. Here, the "on-line storage media" mean storage media that are in a state in which the reading/writing can be started immediately in response to a read/write request. In this embodiment, the hard disks 210 in the on-line state correspond to the "on-line storage media". Meanwhile, the "off-line storage media" mean storage media that are in a power-saving state in the standby state and that have to be started up (activated) in response to a read/write request. In this embodiment, the hard disks 210 in the spin down state or in the spin off state, the optical disks 310 and the magnetic tapes 410 correspond to the "off-line storage media".

Next, the structure of the stream file 600, which the file server 100 in this embodiment mainly handles, will be explained below.

Figure 3:
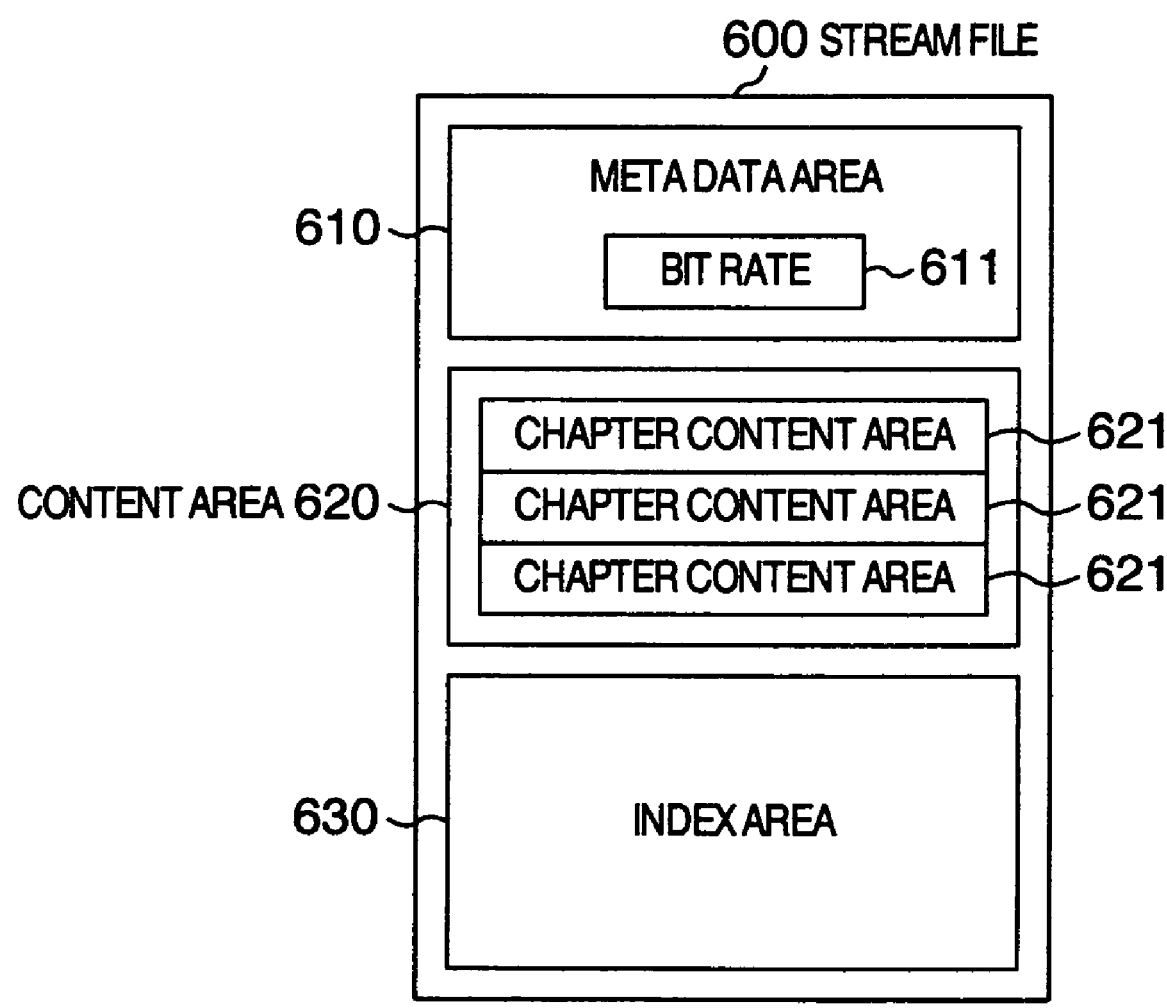
FIG. 3 is a schematic diagram showing an example of the structure of a stream file.

FIG. 3 is a schematic diagram showing an example of the structure of the stream file 600. The stream file 600 includes a meta data area 610 and a content area 620 (and an index area 630 when necessary). The meta data area 610 stores meta data such as the bit rate 611 of the stream file 600 (bit rate information) and the size of the stream file 600 (unshown). The content area 620 stores content data such as video data and audio data. The index area 630 stores index data (index information) necessary for random access to the content data (video data, audio data, etc.) stored in the content area 620 (for playback from an arbitrary point).

There are cases where the content area 620 is made up of a plurality of chapter content areas 621. In such cases, each chapter content area 621 corresponds to each part (e.g. video/audio part) of the content data which is made up of multiple parts. In this embodiment, each part will be referred to as a "chapter".

Incidentally, the structure shown in FIG. 3 is just an example; the structure of the stream file 600 can vary depending on its format. The detailed form of each area varies depending on the format of the stream file 600.

Next, principal functions of the file server 100 in this embodiment (split arrangement (splitting the stream file 600 into multiple segments and arranging the segments in multiple layers), chapter split arrangement of the chapter content areas 621, index on-line arrangement (arranging the index areas 630 of the stream files 600 in the on-line layer 510) and rearrangement of the stream files 600) will be explained below based on the above explanation. After explaining each of the functions (split arrangement, chapter split arrangement, index on-line arrangement, rearrangement), a concrete example will be described referring to FIG. 14.

The split arrangement means a function of storing parts of the stream file 600 that have to be read out quickly (e.g. first parts of the chapter content areas 621 shown in FIG. 14) in the on-line layer 510 (see FIG. 2) while storing the other parts of the stream file 600 (e.g. second parts of the chapter content areas 621 shown in FIG. 14) in the off-line layer 580 (see FIG. 2). In the reading process, the off-line layer 580 is started up (activated) while the reading from the on-line layer 510 is carried out. In order to reduce the electric power consumption to a minimum, only the minimum part of the stream file 600 is stored in the on-line layer 510 based on the bit rate 611 of the stream file 600 and startup time of the off-line layer 580 (time necessary for activating the off-line layer 580). In this embodiment, the segments of the stream file 600 undergoing the split arrangement will be referred to as "file segments".

The chapter split arrangement means a function of storing heading parts of the chapter content areas 621 of the stream file 600 in the on-line layer 510 along with executing the split arrangement. In cases where selective playback of a chapter is possible, quickly starting the playback of an arbitrary chapter is made possible by the split arrangement.

The index on-line arrangement means a function of storing the index area 630 of the stream file 600 in the on-line layer 510 along with executing the split arrangement. In cases where random access to a stream file 600 is possible, the random access performance can be increased by the index on-line arrangement.

Whether the split arrangement, the chapter split arrangement or the index on-line arrangement should be executed or not can be specified by the user as policies in regard to each filename extension. Files can be classified into stream files and non-stream files. A characteristic of the stream file is that the file is read out sequentially at a constant speed (bit rate) specific to the file.

The rearrangement (optimization of the data storage configuration depending on the read/write frequency of each file) means functions of split-arranging a file that has not been split-arranged, canceling the split arrangement of a file that has been split-arranged, newly split-arranging a file in different layers in the off-line layer 580, etc. Further reduction of the electric power consumption becomes possible by storing files having a high read/write frequency (files which are read/wrote frequently) in the on-line layer 510 or in a layer in the off-line layer 580 whose startup power consumption is low while storing files having a low read/write frequency in a layer in the off-line layer 580 whose standby power consumption is low.

A threshold value regarding the access frequency, to be used for judging whether the rearrangement should be executed or not, can be specified by the user as a policy in regard to each filename extension and each off-line layer (each layer in the off-line layer 580) used as a storage location for the split arrangement.

Figure 14:
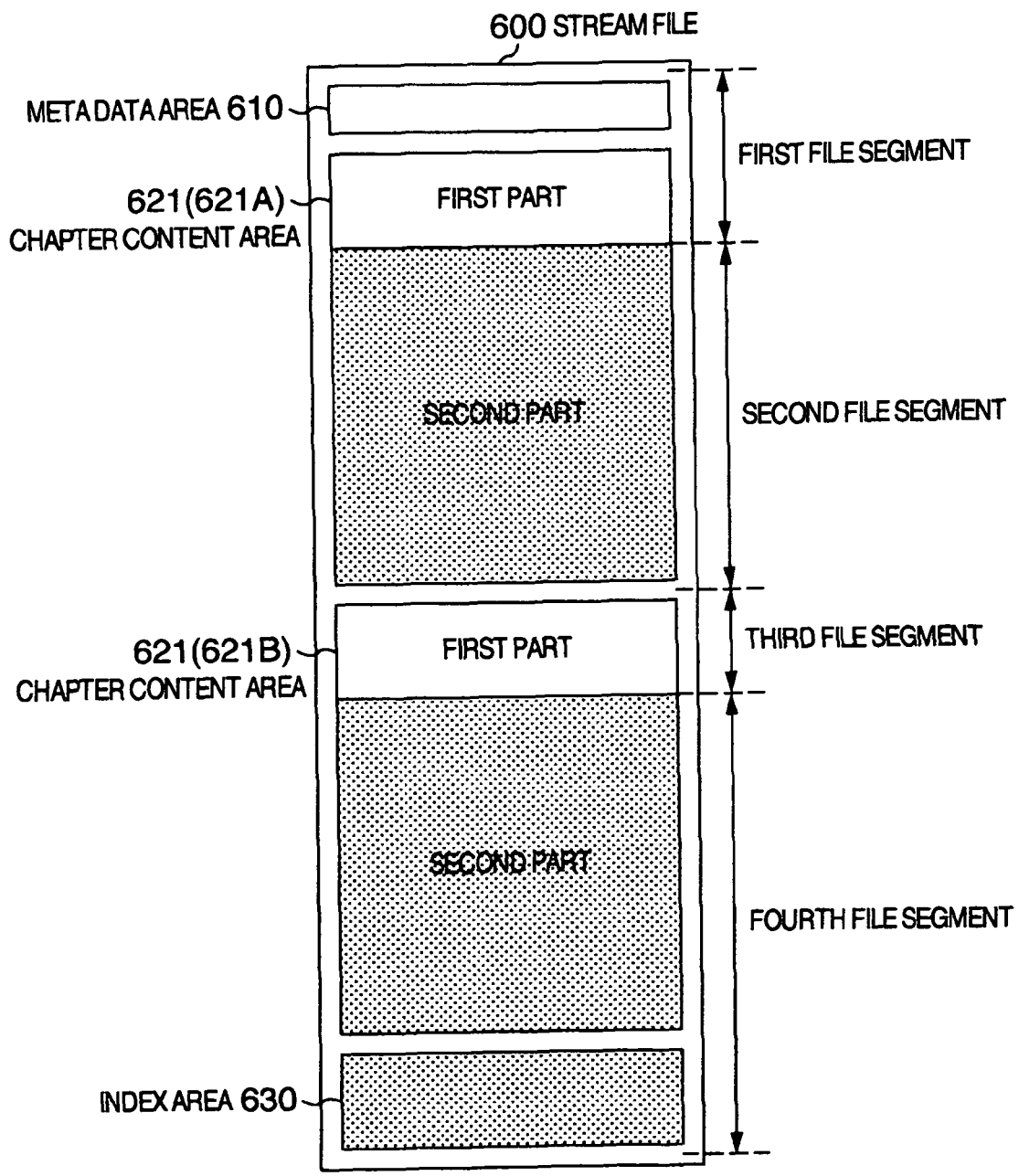
FIG. 14 is a schematic diagram showing an example of split arrangement status of a stream file.

FIG. 14 is a schematic diagram showing an example of split arrangement status of a stream file 600. FIG. 14 shows a case where the stream file 600 includes a meta data area 610, two chapter content areas 621 and an index area 630. In the example, the policies of executing the chapter split arrangement and not executing the index on-line arrangement to the stream file 600 have been employed.

In this example of split arrangement status, the stream file 600 is split into four file segments. The first file segment, which is made up of the meta data area 610 and a forefront part (hereinafter referred to as a "first part") of the first chapter content area 621 (621A), is stored in the on-line layer 510.

The second file segment, which is made up of a part of the first chapter content area 621 (621A) excluding the aforementioned first part (hereinafter referred to as a "second part"), is stored in the off-line layer 580. Incidentally, the splitting position between the first part and the second part varies depending on an ending address 145 shown in FIG. 8 (splitting position) which will be explained later.

The third file segment, which is made up of the first part of the second chapter content area 621 (621B), is stored in the on-line layer 510.

The fourth file segment, which is made up of the second part of the second chapter content area 621 (621B) and the index area 630, is stored in the off-line layer 580.

A change in the split arrangement status, occurring when the off-line layers as storage locations for the split arrangement are changed due to the rearrangement, will be explained here using the above example of split arrangement status. In the rearrangement, the size of the first part, to be stored in the on-line layer 510, of each chapter content area 621 is recalculated, and consequently, the boundary position between the first and second file segments and the boundary position between the third and fourth file segments are changed to positions that are different from those before the rearrangement.

Next, the outline of processes executed by the file server 100 in this embodiment will be explained below.

Figure 4:
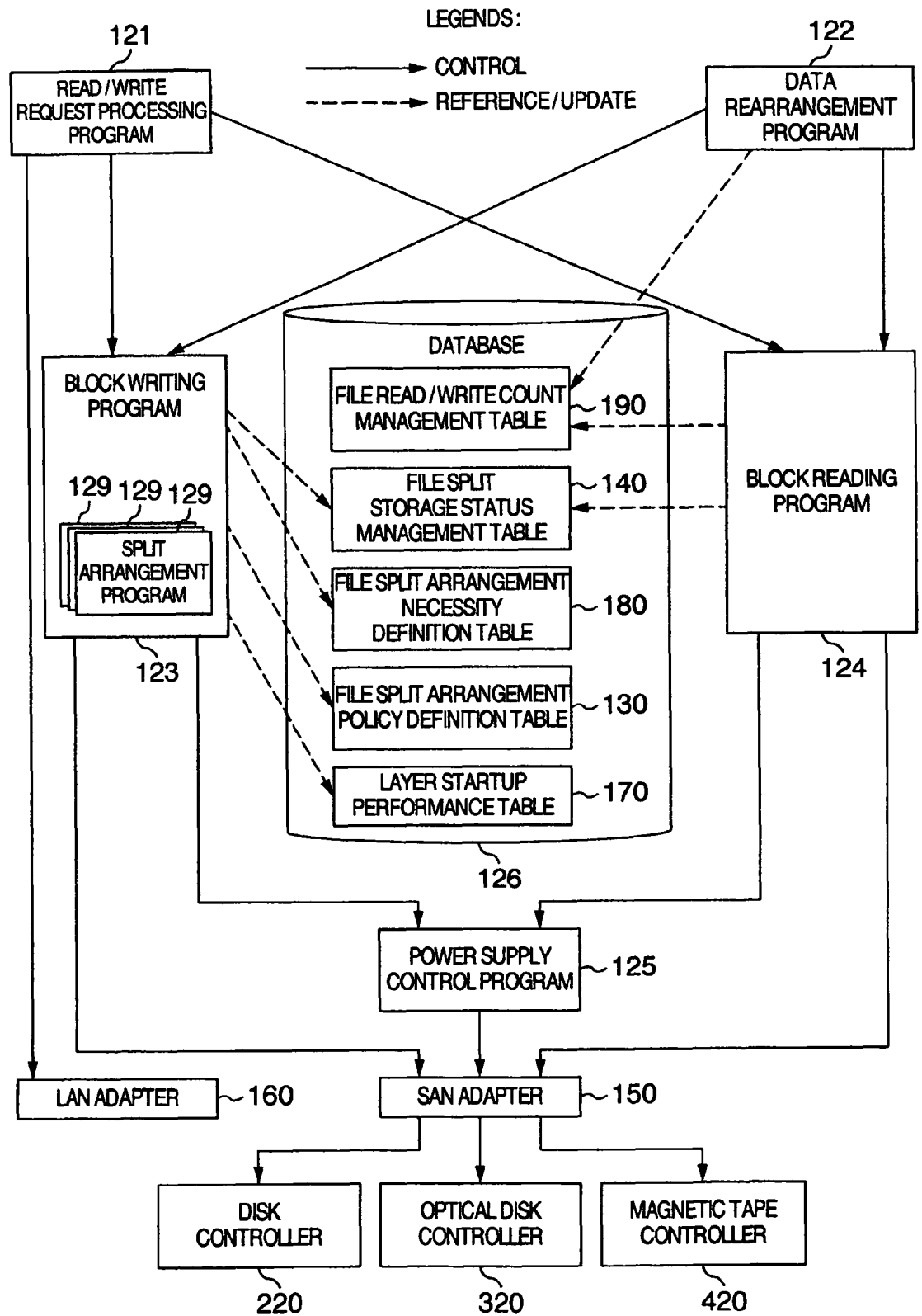
FIG. 4 is a block diagram showing a dependence relationship among data, programs and devices in the system while focusing on a database of a file server.

FIG. 4 is a block diagram showing a dependence relationship among data, programs and devices while focusing on the database 126. As shown in FIG. 1, the database 126 includes the file split arrangement necessity definition table 180 (see FIG. 5), the file split arrangement policy definition table 130 (see FIG. 6), the file read/write count management table 190 (see FIG. 9), the file split storage status management table 140 (see FIG. 8) and the layer startup performance table 170 (see FIG. 7).

The file split arrangement necessity definition table 180 (see FIG. 5) is a table in which whether the split arrangement should be executed or not is defined for each file format managed by the file server 100. The file split arrangement policy definition table 130 (see FIG. 6) is a table in which policies regarding the split arrangement and the rearrangement are defined for each file format managed by the file server 100 and for each storage device layer as a storage location. The file read/write count management table 190 (see FIG. 9) is a table in which the number of times of reading/writing is stored for each file managed by the file server 100. The file split storage status management table 140 (see FIG. 8) is a table which is used for managing the storage locations of file segments that have been split-arranged. The layer startup performance table 170 (see FIG. 7) is a table which is used for managing the startup time of each storage device layer (time necessary for each layer to be ready for reading/writing).

The read/write request processing program 121 provides the media server 800 with an input interface in conformity with prescribed file system protocols (NFS (Network File System), CIFS (Common Internet File System), etc.). The read/write request processing program 121 receives a read/write command from the media server 800 via the LAN adapter 160 and hands over the control to the block writing program 123 or the block reading program 124 depending on the contents of the command.

The data rearrangement program 122 moves data managed by the file server 100 to a layer suitable for the data's read/write frequency. The data rearrangement program 122 calculates the read/write frequency of each file by referring to the file read/write count management table 190. When the calculated read/write frequency is not permissible for the layer currently storing the file, the data rearrangement program 122 executes a rearrangement process by use of the block writing program 123 and the block reading program 124.

The block writing program 123, for processing write requests to the file server 100, includes a plurality of split arrangement programs 129 corresponding to multiple file formats. The block writing program 123 selects a split arrangement program 129 corresponding to the format of the currently processed file and executes the split arrangement of the file based on the file split arrangement necessity definition table 180, the file split arrangement policy definition table 130 and the layer startup performance table 170. The block writing program 123 turns ON the power of a storing device (storage device as a storage location of the file to be written) using the power supply control program 125 upon reception of a close command, issues a write command to a disk controller 220, optical disk controller 320 or magnetic tape controller 420 via the SAN adapter 150, turns OFF the power of the storing device using the power supply control program 125, and updates the file split storage status management table 140.

Incidentally, each split arrangement program 129 is created as a plug-in. Therefore, when a new file format is employed, for example, a new split arrangement program 129 corresponding to the new file format can be created and applied to this embodiment.

The block reading program 124 processes read requests to the file server 100. The block reading program 124 turns ON the power of a storing device (storage device as a storage location of the file to be read out) using the power supply control program 125 based on the file split storage status management table 140, issues a read command for a storage medium via the SAN adapter 150, updates the file read/write count management table 190, and turns OFF the power of the storing device using the power supply control program 125.

The power supply control program 125 issues a command for controlling the power supply of a device or storage medium to a disk controller 220, optical disk controller 320 or magnetic tape controller 420 via the SAN adapter 150.

In the following, the details of data stored in the tables shown in FIG. 4 and processes executed by the programs shown in FIG. 4 will be described in detail.

FIG. 5 is a table showing the data stored in the file split arrangement necessity definition table 180. The file split arrangement necessity definition table 180 stores data in regard to an extension name 181, split arrangement necessity 182 and default layer 183. The extension name 181 is the principal key of the table 180. Each column of the table 180 represents split arrangement policies which are applied to files having particular filename extensions.

The split arrangement necessity 182, for indicating whether the split arrangement of a file is necessary or not, stores data meaning "necessary" or "unnecessary". The default layer 183 stores data indicating an off-line layer 580 (i.e. a layer in the off-line layer 580) to be selected as the write destination of the file when the file is split-arranged. The data indicating an off-line layer (write destination) is stored only in rows whose split arrangement necessity 182 is "necessary".

The values in the file split arrangement necessity definition table 180 are set appropriately by the administrator of the media server 800 depending on the functions and performance requirements of the media server 800. The set values shown in FIG. 5 are an example in a specific case where the media server 800 is assumed to handle two stream file formats represented by filename extensions "mpg" and "wmv" and two non-stream file formats represented by filename extensions "exe" and "txt".

Incidentally, while the setting information of the file split arrangement necessity definition table 180 is managed in the database 126 in this embodiment, it is also possible to provide a setting function employing a setting file in order to facilitate the setting of the values. Specifically, the administrator of the media server 800 may write appropriate set values to a setting file stored in a built-in hard disk (unshown) of the media server 800 in a prescribed format by inputting the set values to an unshown file editing program running on the OS (Operating System) of the media server 800 through a keyboard while viewing a monitor. In this case, the block writing program 123 (see FIG. 1) reads out the set values from the setting file instead of reading out the table stored in the database 126.

FIG. 6 is a table showing the data stored in the file split arrangement policy definition table 130. The file split arrangement policy definition table 130 stores data in regard to an extension name 131, storing device layer name 132, split arrangement program name 133, chapter split arrangement necessity 134, index on-line splitting necessity 135, safety coefficient (for segment size calculation) 136, read/write frequency upper threshold 137 and read/write frequency lower threshold 138. The extension name 131 and the storing device layer name 132 are the principal keys of the table 130. Each column of the table 130 represents split arrangement policies which are employed when files having particular filename extensions are split-arranged in particular off-line layers 580. Incidentally, the permissible range of the read/write frequency (specified by the read/write frequency upper threshold 137 and the read/write frequency lower threshold 138) includes the lower threshold value described in the read/write frequency lower threshold 138 but does not include the upper threshold value described in the read/write frequency upper threshold 137. In the case of the row 139, for example, the file is desired to be in the spin off layer 530 when a condition "20 times/day≦read/write frequency<50 times/day" is satisfied.

The values in the file split arrangement policy definition table 130 are set appropriately by the administrator of the media server 800 depending on the functions and performance requirements of the media server 800. The set values shown in FIG. 6 are an example about a stream file format represented by the filename extension "mpg". Incidentally, while the setting information of the file split arrangement policy definition table 130 is managed in the database 126 in this embodiment, it is also possible to provide a setting function employing a setting file in order to facilitate the setting of the values.

The split arrangement program name 133 represents the name of the split arrangement program 129 (among the plurality of split arrangement programs 129 included in the block writing program 123) to be employed when a file having the particular filename extension is split-arranged into the particular layer.

The chapter split arrangement necessity 134, serving as a flag indicating whether or not the chapter split arrangement should be executed when a file having the particular filename extension is split-arranged into the particular layer, stores data meaning "necessary" or "unnecessary". By setting the flag at "necessary" in cases where the media server 800 provides the user with the function of playing back the file in units of chapters, quick playback of an arbitrarily requested chapter is made possible.

The index on-line splitting necessity 135, serving as a flag indicating whether or not the index on-line arrangement should be executed when a file having the particular filename extension is split-arranged into the particular layer, stores data meaning "necessary" or "unnecessary". By setting the flag at "necessary" in cases where the media server 800 provides the user with the fast-forward function, rewinding function, jump function, etc. for the streaming, the reaction time of the functions can be shortened.

The safety coefficient (for segment size calculation) 136 represents a safety coefficient as a multiplier to be used for determining the size of the file segment to be stored in the on-line layer 510 when a file having the particular filename extension is split-arranged into the particular layer. The safety coefficient is used for preventing too early completion of the playback of the file segment stored in the on-line layer 510 before the startup of a storage medium in the off-line layer 580 is completed when the bit rate is not uniform in the content area 620 or when there exist fluctuations in the startup time of a storage medium.

The read/write frequency upper threshold 137 and the read/write frequency lower threshold 138 represent the permissible range of the read/write frequency which is permissible when a file having the particular filename extension is split-arranged into the particular layer. The thresholds 137 and 138 indicate that the data (file) should be handled as the target of the rearrangement when its read/write frequency has gone out of the permissible range. In the example shown in FIG. 6, there is defined a policy specifying that a file (shown in the row 139) having the filename extension "mpg" and having been split-arranged into the spin off layer 530 should be rearranged into a different layer when the read/write frequency of the file is 50 times/day or more. Similarly, there is also defined a policy specifying that the file having the filename extension "mpg" and having been split-arranged into the spin off layer 530 should be rearranged into a different layer when the read/write frequency of the file is less than 20 times/day.

FIG. 7 is a table showing the data stored in the layer startup performance table 170. The layer startup performance table 170 stores data in regard to a layer name 171 and startup time 172. The layer name 171 is the principal key of the table 170. The startup time 172 indicates time necessary for a storage medium in the layer specified by the layer name 171 to shift from the standby state to a state in which the reading/writing is possible.

The values in the layer startup performance table 170 are set by the administrator of the file server 100 based on startup performance data disclosed by the manufacturers of the storage devices (magnetic disk devices 200, optical disk devices 300, magnetic tape devices 400). Incidentally, while the setting information of the layer startup performance table 170 is managed in the database 126 in this embodiment, it is also possible to provide a setting function employing a setting file in order to facilitate the setting of the values.

FIG. 8 is a table showing the data stored in the file split storage status management table 140. The file split storage status management table 140 stores data in regard to a path name 141, file name 142, file segment number 143, starting address 144, ending address 145 (splitting position), storing layer name 149, storing device name 146, storing medium number 147 and storage location address 148. The path name 141, the file name 142 and the file segment number 143 are the principal keys of the table 140. Each column of the table 140 represents the storage locations of file segments when a file specified by the path name 141 and the file name 142 is split-arranged.

The values shown in FIG. 8 are an example indicating the storage status of a file "comets.mpg" which has been split-arranged into the spin off layer 530 and a file "quarks.mpg" which has not been split-arranged. The values in FIG. 8 regarding the file "comets.mpg" correspond to the aforementioned example of split arrangement status shown in FIG. 14. Specifically, the first through fourth file segments shown in FIG. 14 correspond to the four file segments having the file segment numbers 1-4 in the column "file segment number 143".

The starting address 144 and the ending address 145, which correspond to the starting address and the ending address of each file segment, indicate the range of the logical address of the file segment. The storing layer name 149 indicates the layer in which the file segment has been stored. The storing device name 146 indicates the name of the storage device (magnetic disk device 200, optical disk device 300 or magnetic tape device 400) in which the file segment has been stored. The storing medium number 147 indicates the storage medium (hard disk 210, optical disk 310 or magnetic tape 410) in which the file segment has been stored. The storage location address 148 indicates the physical address of the front end of the file segment in the hard disk 210, optical disk 310 or magnetic tape 410.

Incidentally, while the file split storage status management table 140 is placed in the database 126 of the file server 100 in this embodiment, the table 140 may also be placed in a hard disk 210 of a magnetic disk device 200 in the system.

FIG. 9 is a table showing the data stored in the file read/write count management table 190. The file read/write count management table 190 stores data in regard to a path name 191, file name 192 and read/write count 193. The path name 191 and the file name 192 are the principal keys of the table 190. The read/write count 193 indicates the result of counting the number of times of reading/writing of the file specified by the path name 191 and the file name 192.

The values shown in FIG. 9 are an example indicating that the read/write count of the file "comets.mpg" is 30 times and that of the file "quarks.mpg" is 150 times.

While the file read/write count management table 190 is placed in the database 126 of the file server 100 in this embodiment, the table 190 may also be placed in a hard disk 210 of a magnetic disk device 200 in the system.

In the following, processes executed by the read/write request processing program 121 will be described below referring to FIG. 4.

The read/write request processing program 121 receives a read/write command from the media server 800 via the LAN adapter 160. When a command in a write mode is received, the read/write request processing program 121 processes subsequent commands for the same file by calling up the block writing program 123. When a command in a read mode is received, the read/write request processing program 121 processes subsequent commands for the same file by calling up the block reading program 124.

A supplementary explanation will be given here of parameters which are handed over to the block writing program 123 when the read/write request processing program 121 calls up the block writing program 123. The read/write request processing program 121 extracts a row of the file split arrangement necessity definition table 180 (FIG. 5) whose extension name 181 coincides with the filename extension of the file to be written and then acquires the values of the split arrangement necessity 182 and the default layer 183 from the extracted row. The read/write request processing program 121 hands over the acquired value of the split arrangement necessity 182 to the block writing program 123 when calling it up. In cases where the acquired value of the split arrangement necessity 182 represents "necessary", the acquired value of the default layer 183 is also handed over to the block writing program 123 as the name of the off-line layer 580 as the storage location for the split arrangement.

Incidentally, no additional writing command (for adding data to an existing stream file 600) is accepted in this embodiment since such additional writing is unnecessary for the purpose of streaming playback. The read/write request processing program 121 can receive not only the file read/write commands but also commands for creating a file, deleting a file, acquiring a file list, etc. While such commands are executed by conducting addition/deletion/reference processes to the file read/write count management table 190 and the file split storage status management table 140, detailed explanation of the processes is omitted since the processes can be implemented within the scope of conventional techniques.

Figure 10:
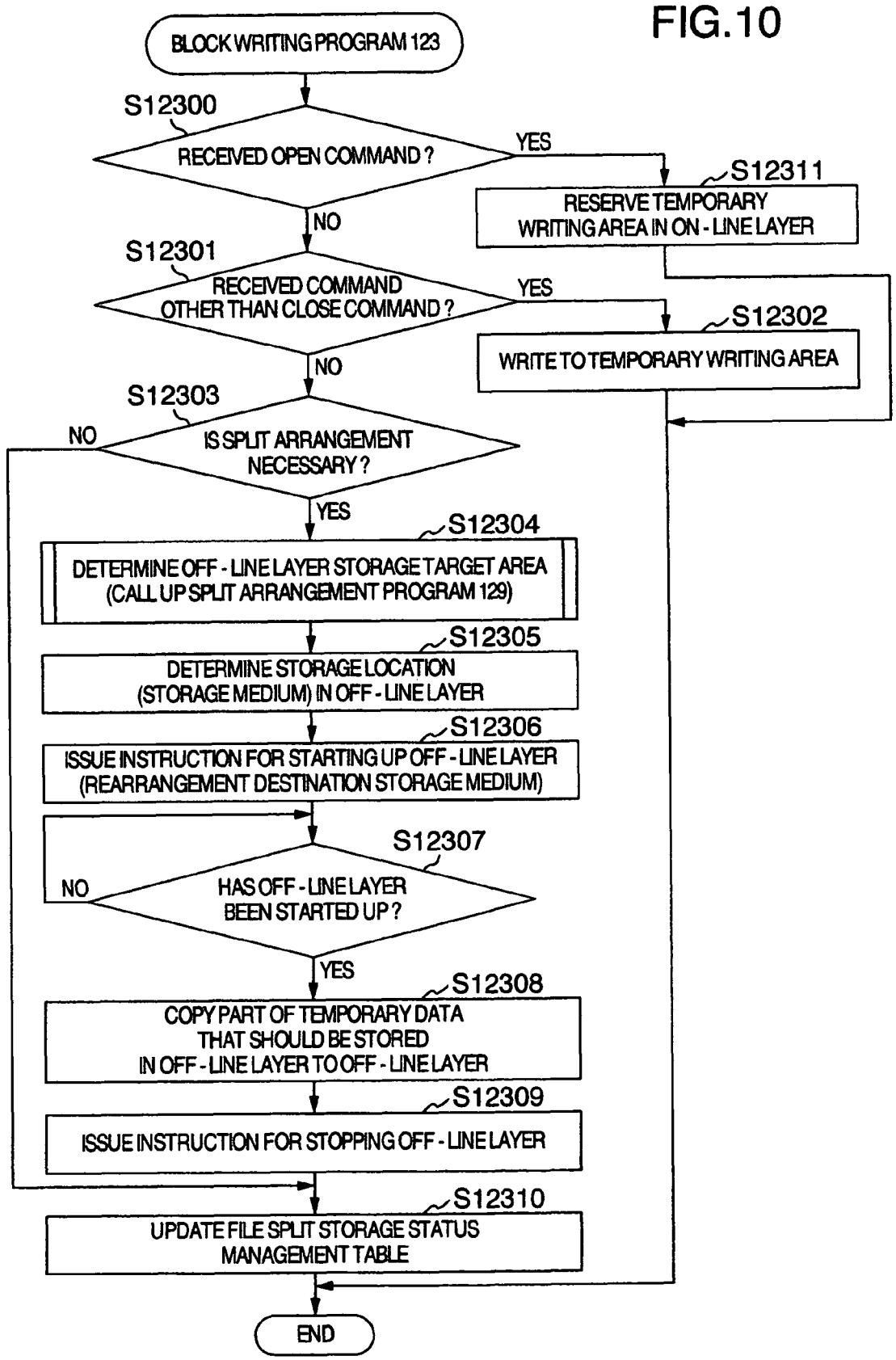
FIG. 10 is a flow chart showing the process flow of a block writing program.

FIG. 10 is a flow chart showing the process flow of the block writing program 123. The process flow of the block writing program 123 shown in FIG. 4 will be explained in detail below referring to FIG. 10. The block writing program 123 receives the path name, the file name, the write command received by the file server 100 and the file split arrangement necessity as the parameters from the calling source (caller). When the file split arrangement necessity represents "necessary", the layer name of an off-line layer 580 is also received as an additional parameter. Incidentally, the block writing program 123 is executed by the CPU 110 of the file server 100.

In step S12300, the CPU 110 judges whether the command received by the file server 100 is an open command or not. If affirmative (S12300: YES), the process advances to step S12311, otherwise (S12300: NO) the process advances to step S12301.

In the step S12311, the CPU 110 selects a hard disk 210 that has not been registered in the storing device name 146 and the storing medium number 147 in the file split storage status management table 140 from the hard disks 210 in the on-line layer 510, reserves the selected hard disk 210 as a temporary writing area, and ends the process of FIG. 10 (i.e. ends the execution of the block writing program 123).

In the step S12301, the CPU 110 judges whether the command received by the file server 100 is a command other than a close command or not. If affirmative (S12301: YES), the process advances to step S12302, otherwise (S12301: NO) the process advances to step S12303.

In the step S12302, the CPU 110 executes writing to the temporary writing area reserved in S12311 according to the command received by the file server 100 and thereafter ends the process of FIG. 10.

In the step S12303, the CPU 110 judges whether the split arrangement is necessary or not based on the parameter regarding the file split arrangement necessity received from the caller. If the split arrangement is unnecessary (S12303: NO), the process advances to step S12310. If the split arrangement is necessary (S12303: YES), the process advances to step S12304.

In the step S12304, the CPU 110 extracts a row of the file split arrangement policy definition table 130 whose extension name 131 coincides with the extension of the file name received from the caller and whose storing device layer name 132 coincides with the layer name of the storing layer received from the caller, selects a split arrangement program 129 corresponding to the split arrangement program name 133 in the extracted row, calls up the selected split arrangement program 129, and determines an off-line layer storage target area (i.e. an area to be stored in an off-line device (off-line layer)). Thereafter, the process advances to step S12305.

Incidentally, when the split arrangement program 129 is called up, the data written to the temporary writing area explained in S12311 and S12302 is handed over to the split arrangement program 129 as the contents of the stream file 600.

In the step S12305, the CPU 110 selects a storage medium in the layer corresponding to the layer name received from the caller that has not been registered in the storing device name 146 and the storing medium number 147 in the file split storage status management table 140 and determines the selected storage medium as the storage medium for storing the off-line layer storage target area. Thereafter, the process advances to step S12306.

In the step S12306, the CPU 110 issues an instruction for starting up the rearrangement destination storage medium (i.e. the storage medium determined in S12305 as the storage location for the rearrangement) to the power supply control program 125.

In the next step S12307, the CPU 110 checks whether the startup of the rearrangement destination storage medium determined in S12305 has been completed or not via the power supply control program 125. If the startup has not been completed yet (S12307: NO), the CPU 110 repeats the step S12307 to wait until the startup is completed. When the startup of the rearrangement destination storage medium is judged to be completed (S12307: YES), the process advances to step S12308.

In the step S12308, the CPU 110 successively copies part of the temporarily written data (i.e. the data temporarily written to the on-line layer 510) corresponding to the off-line layer storage target area determined in S12304 to the rearrangement destination storage medium determined in S12305. After finishing the copying, the CPU 110 issues an instruction for stopping the rearrangement destination storage medium determined in S12305 to the power supply control program 125 (S12309) and thereafter advances to the step S12310.

In the step S12310, the CPU 110 adds rows (corresponding to the file segments stored in the on-line layer 510 and the file segments stored in the off-line layer 580) to the file split storage status management table 140 and thereafter ends the block writing program 123 and returns to the caller. Incidentally, the file segment number 143 in the file split storage status management table 140 is assigned to each file segment so that the number differ among the file segments of a file.

Figure 11:
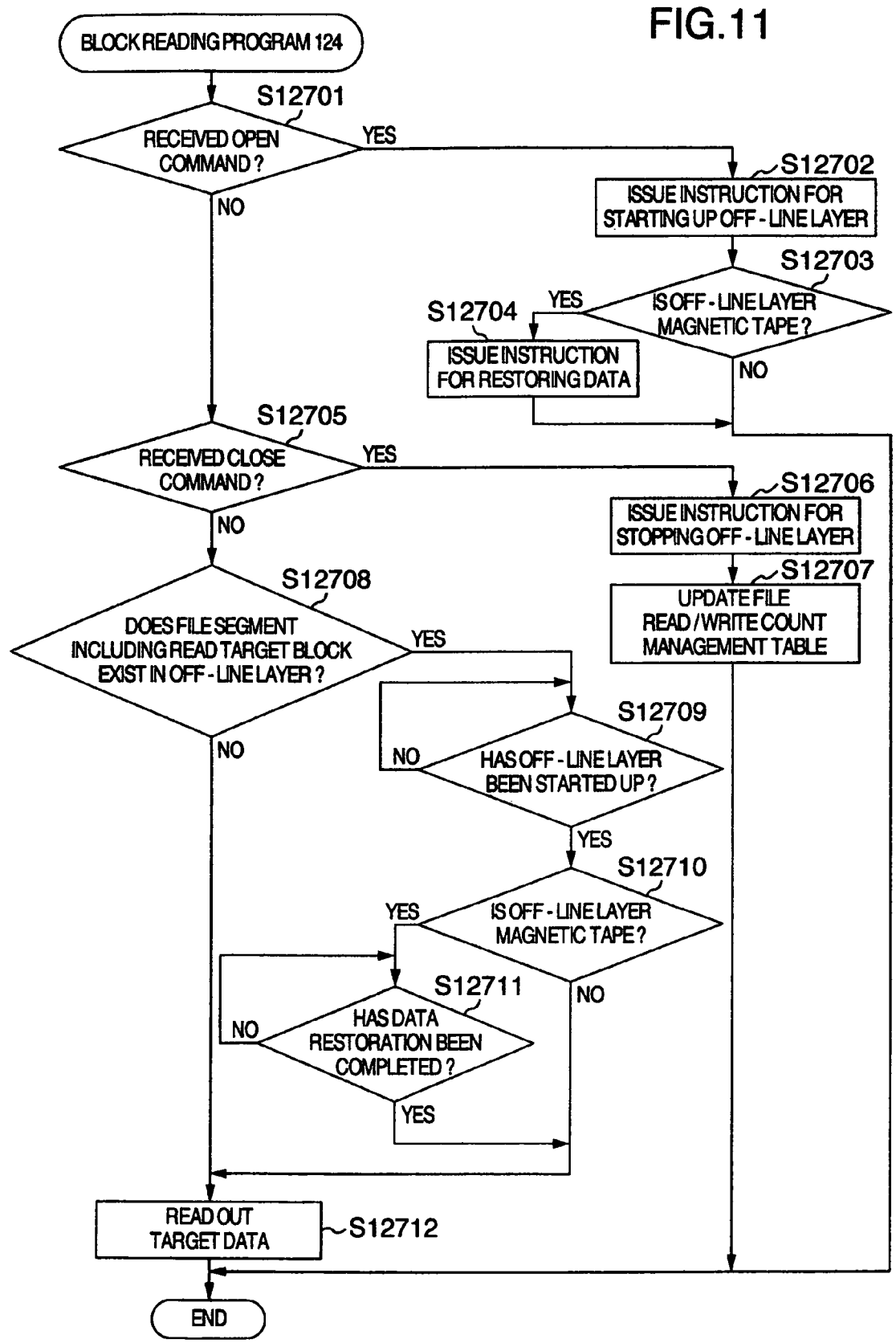
FIG. 11 is a flow chart showing the process flow of a block reading program.

FIG. 11 is a flow chart showing the process flow of the block reading program 124. The process flow of the block reading program 124 shown in FIG. 4 will be explained in detail below referring to FIG. 11. The block reading program 124 receives the path name, the file name and the read command received by the file server 100 as the parameters from the caller. The block reading program 124 is executed by the CPU 110 of the file server 100.

In step S12701, the CPU 110 judges whether the command received by the file server 100 is an open command or not. If affirmative (S12701: YES), the process advances to step S12702, otherwise (S12701: NO) the process advances to step S12705.

In the step S12702, the CPU 110 extracts a row of the file split storage status management table 140 whose path name 141 and file name 142 coincide with the path name and file name received from the caller, acquires the storing device name 146 and the storing medium number 147 from the extracted row, issues an instruction for starting up a corresponding storage medium to the power supply control program 125, and then the process advances to step S12703.

In step S12703, the CPU 110 judges whether the storing layer name 149 in the row extracted in S12702 is the magnetic tape layer 560 or not. If affirmative (S12703: YES), the CPU 110 advances to step S12704, otherwise (S12703: NO) the CPU 110 ends the block reading program 124 and returns to the caller.

In the step S12704, the CPU 110 issues an instruction for making a restoration of data stored in the magnetic tape 410 (corresponding to the storing medium number 147 acquired in S12702) of the magnetic tape device 400 (corresponding to the storing device name 146 acquired in S12702) in the magnetic tape data restoration region 570 of a magnetic disk device 200. Thereafter, the CPU 110 ends the block reading program 124 and returns to the caller.

In the step S12705, the CPU 110 judges whether the command received by the file server 100 is a close command or not. If affirmative (S12705: YES), the process advances to step S12706, otherwise (S12705: NO) the process advances to step S12708.

In the step S12706, the CPU 110 extracts a row of the file split storage status management table 140 whose path name 141 and file name 142 coincide with the path name and file name received from the caller, acquires the storing device name 146 and the storing medium number 147 from the extracted row, and issues an instruction for stopping corresponding storage device and storage medium to the power supply control program 125.

In the next step S12707, the CPU 110 extracts a row of the file read/write count management table 190 whose path name 191 and file name 192 coincide with the path name and file name received from the caller and then increments the value of the read/write count 193 in the extracted row by 1. Thereafter, the CPU 110 ends the block reading program 124 and returns to the caller.

In the step S12708, the CPU 110 extracts a row of the file split storage status management table 140 whose path name 141 and file name 142 coincide with the path name and file name received from the caller and whose starting address 144 and ending address 145 satisfy a condition that an area defined by the addresses 144 and 145 includes the logical address of a read target block specified by the read command received from the caller, and then judges whether or not the storing layer name 149 in the extracted row belongs to the off-line layer 580. If affirmative (S12708: YES), the process advances to step S12709, otherwise (S12708: NO) the process advances to step S12712.

In the step S12709, the CPU 110 acquires the storing device name 146 and the storing medium number 147 from the row extracted in S12708 and then checks whether corresponding storage device and storage medium have been started up or not via the power supply control program 125. If the startup has not been completed yet (S12709: NO), the CPU 110 repeats the step S12709 to wait until the startup is completed. When the startup of the corresponding storage device and storage medium is judged to be completed (S12309: YES), the process advances to step S12710.

In the step S12710, the CPU 110 judges whether the storing layer name 149 in the row extracted in S12708 is the magnetic tape layer 560 or not. If affirmative (S12710: YES), the process advances to step S12711, otherwise (S12710: NO) the process advances to the step S12712.

In the step S12711, the CPU 110 checks whether the restoration of the data in the magnetic tape 410 ordered in S12704 has been completed or not. If the restoration has not been completed yet (S12711: NO), the CPU 110 repeats the step S12711 to wait until the restoration is completed. When the restoration of the data is judged to be completed (S12311: YES), the process advances to the step S12712.

In the step S12712, the CPU 110 reads out data from the storage medium specified by the storing device name 146 and the storing medium number 147 in the row extracted in S12708 (hard disk 210, optical disk 310 or magnetic tape 410) according to the read command received by the file server 100. In the data reading, each logical address of the file included in the read command is associated with each physical address of the storage medium by use of the starting address 144 and the storage location address 148 in the row extracted in S12708. When the data reading (S12712) is completed, the CPU 110 ends the block reading program 124 and returns to the caller.

Figure 12:
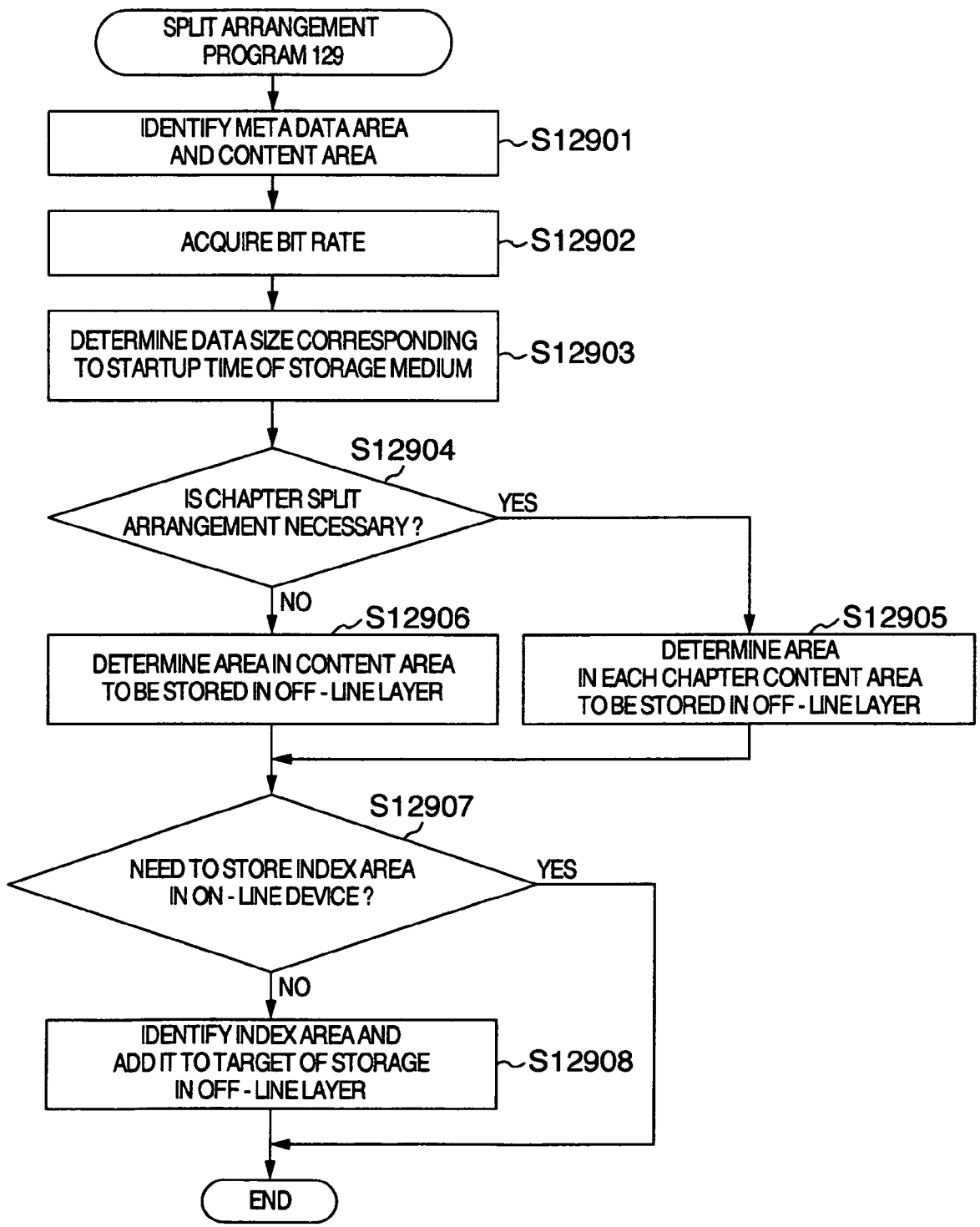
FIG. 12 is a flow chart showing the process flow of a split arrangement program.

FIG. 12 is a flow chart showing the process flow of the split arrangement program 129. The process flow of the split arrangement program 129 shown in FIG. 4 will be explained in detail below referring to FIG. 12. The split arrangement program 129 receives the contents of the stream file 600 to be split-arranged and the layer name of the off-line layer for the split arrangement as the parameters from the caller. The split arrangement program 129 is executed by the CPU 110 of the file server 100.

In step S12901, the CPU 110 parses (or analyzes the construction of) the contents of the stream file 600 received from the caller according to the specifications of file formats supported by the split arrangement program 129 and thereby identifies the meta data area 610 and the content area 620 of the stream file 600.

In the next step S12902, the CPU 110 parses the contents of the meta data area 610 identified in S12901 and thereby acquires the bit rate 611 from the meta data area 610.

In the next step S12903, the CPU 110 determines a data size corresponding to the startup time of the storage medium. Specifically, the CPU 110 extracts a row of the layer startup performance table 170 whose layer name 171 coincides with the layer name received from the caller, acquires the startup time 172 from the extracted row, extracts a row of the file split arrangement policy definition table 130 whose extension name 131 coincides with the filename extension of a file format supported by the program and whose storing device layer name 132 coincides with the layer name received from the caller, acquires the chapter split arrangement necessity 134, the index on-line splitting necessity 135 and the safety coefficient (for segment size calculation) 136 from the extracted row, and calculates the data size corresponding to the startup time of the storage medium by multiplying the bit rate 611 acquired in S12902 by the startup time 172 and the safety coefficient (for segment size calculation) 136 acquired above.

A concrete example of the data size calculation (S12903) will be shown here. In a specific case where the set values shown in FIGS. 6 and 7 are employed and a file with a filename extension "mpg" whose bit rate is 0.1 megabytes/second is split-arranged into the spin off layer 530, the data size is calculated as "1.25 megabytes (1310720 bytes)" by multiplying the bit rate "0.1 megabytes/second" by the startup time "10 seconds" in FIG. 7 and the safety coefficient "1.250" in FIG. 6 of the spin off layer 530. Based on the obtained data size, the ending address 145 (splitting position) shown in FIG. 8 is determined.

In the next step S12904, the CPU 110 judges whether the chapter split arrangement is necessary or not based on the chapter split arrangement necessity 134 acquired in S13903. If the chapter split arrangement is necessary (S12904: YES), the process advances to step S12905, otherwise (S12904: NO) the process advances to step S12906.

In the step S12905, the CPU 110 parses the content area 620 acquired in S12901, thereby identifies all chapter content areas 621 included in the content area 620, determines an area in each chapter content area 621 excluding its forefront part with the data size obtained in S12903, and determines the union of the areas determined in the chapter content areas 621. Thereafter, the process advances to step S12907.

In the step S12906, the CPU 110 determines an area in the content area 620 (identified in S12901) excluding its forefront part with the data size obtained in S12903. Thereafter, the process advances to the step S12907.

In the step S12907, the CPU 110 judges whether it is necessary to store the index area 630 in an on-line device or not based on the index on-line splitting necessity 135 acquired in S12903. If not necessary (S12907: NO), the process advances to step S12908. If necessary (S12907: YES), the CPU 110 specifies the area(s) determined in S12905 or S12906 as the target of the storage into the off-line layer 580 and ends the split arrangement program 129 and returns to the caller.

In the step S12908, the CPU 110 parses the contents of the stream file 600 received from the caller according to the specifications of file formats supported by the split arrangement program 129, thereby identifies the index area 630 of the stream file 600, specifies the union of the index area 630 and the area(s) determined in S12905 or S12906 as the target of the storage into the off-line layer 580, and ends the split arrangement program 129 and returns to the caller.

Figure 13:
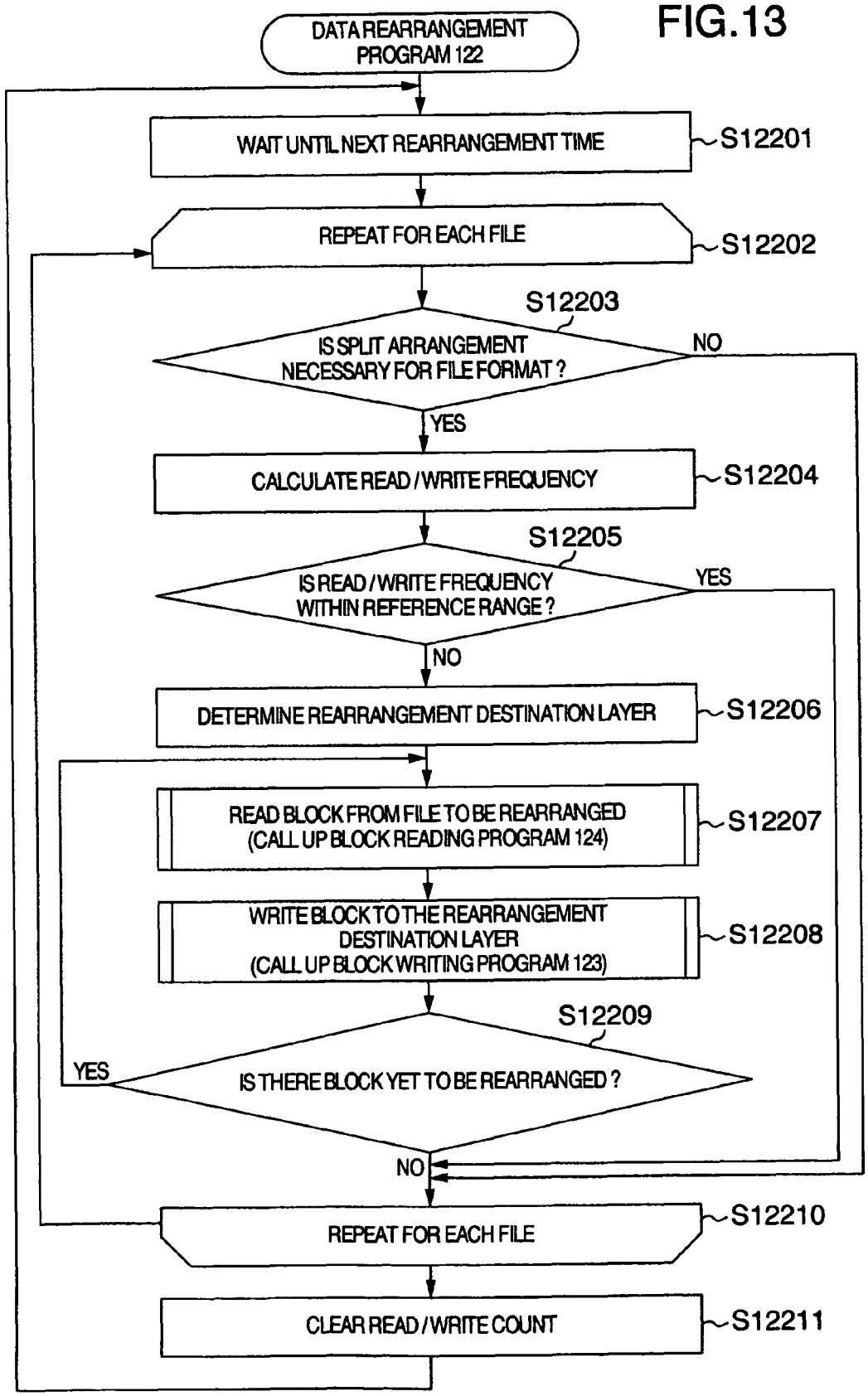
FIG. 13 is a flow chart showing the process flow of a data rearrangement program.

FIG. 13 is a flow chart showing the process flow of the data rearrangement program 122. The process flow of the data rearrangement program 122 shown in FIG. 4 will be explained in detail below referring to FIG. 13. The data rearrangement program 122 is executed by the CPU 110 of the file server 100.

In step S12201, the CPU 110 waits until the next rearrangement time comes. While each rearrangement time is set according to a prescribed rearrangement time interval which has been described in the program in this embodiment, it is also possible to let the user specify each rearrangement time by use of a setting file, etc. The process advances to step S12202 when the next rearrangement time has come.

The process between the steps S12202 and S12210 are executed for every row stored in the file read/write count management table 190.

In step S12203, the CPU 110 judges whether or not the file registered in the currently processed row of the file read/write count management table 190 is in a file format for which the split arrangement is necessary. Specifically, the CPU 110 acquires the path name 191 and the file name 192 from the currently processed row of the file read/write count management table 190, extracts a row of the file split arrangement necessity definition table 180 whose extension name 181 coincides with the extension of the file name 192 acquired above, and acquires the split arrangement necessity 182 from the extracted row. If the split arrangement necessity 182 represents "unnecessary" (S12203: NO), the process advances to step S12210. If the split arrangement necessity 182 represents "necessary" (S12203: YES), the process advances to step S12204.

In the step S12204, the CPU 110 calculates the read/write frequency of the file by dividing the read/write count 193 in the currently processed row by the aforementioned rearrangement time interval.

In the next step S12205, the CPU 110 judges whether or not the read/write frequency calculated in S12204 is within a reference range. Specifically, the CPU 110 extracts a row of the file split storage status management table 140 whose path name 141 and file name 142 coincide with the path name 191 and file name 192 acquired in S12203 and whose storing layer name 149 belongs to the off-line layer 580, extracts a row of the file split arrangement policy definition table 130 whose extension name 131 coincides with the extension of the file name 192 acquired in S12203 and whose storing device layer name 132 coincides with the storing layer name 149 in the extracted row of the file split storage status management table 140, and judges whether or not the row extracted from the file split arrangement policy definition table 130 satisfies a condition: read/write frequency lower threshold 138≦read/write frequency calculated in S12204<read/write frequency upper threshold 137. If affirmative (S12205: YES), the process advances to step S12210, otherwise (S12205: NO) the process advances to step S12206.

In the extraction of a row from the file split storage status management table 140 in the above step S12205, when the file split storage status management table 140 includes no row satisfying the above condition (i.e. when the whole file has been placed in the on-line layer 510 without being split-arranged), the judgment on whether the read/write frequency is within the reference range or not is made as follows: First, the CPU 110 extracts each row of the file split arrangement policy definition table 130 whose extension name 131 coincides with the extension of the file name 192 acquired in S12203. Subsequently, the CPU 110 judges whether or not each extracted row satisfies the condition: read/write frequency lower threshold 138≦read/write frequency calculated in S12204<read/write frequency upper threshold 137. If negative for all the extracted rows, the CPU 110 judges that the read/write frequency is within the reference range (S12205: YES) and advances to the step S12210. If at least one extracted row satisfies the condition, the CPU 110 judges that the read/write frequency is not within the reference range (S12205: NO) and advances to the step S12206.

In the step S12206, the CPU 110 extracts a row of the file split arrangement policy definition table 130 whose extension name 131 coincides with the extension of the file name 192 acquired in S12203 and which satisfies the condition: read/write frequency lower threshold 138≦read/write frequency calculated in S12204<read/write frequency upper threshold 137. When such a row exists in the file split arrangement policy definition table 130, the CPU 110 acquires the storing device layer name 132 from the extracted row and determines a layer corresponding to the storing device layer name 132 as the off-line layer 580 to be used as the storage location for the split arrangement after the rearrangement (hereinafter referred to as a "rearrangement destination layer"). When such a row does not exist in the file split arrangement policy definition table 130, the CPU 110 determines not to execute the split arrangement after the rearrangement.

In the next step S12207, the CPU 110 reads the next block of the file (target of rearrangement) using the block reading program 124.

In the next step S12208, the CPU 110 writes the block acquired in S12207 to the rearrangement destination layer determined in S12206 using the block writing program 123.

Incidentally, the block writing program 123 called up in S12208 recalculates the area to be stored in the off-line layer 580 based on the startup time of the rearrangement destination layer. The details of the recalculation will be explained here taking a specific example in which the set values shown in FIGS. 6 and 7 are employed and a file with a filename extension "mpg" whose bit rate is 0.1 megabytes/second is rearranged from the spin off layer 530 into the spin down layer 520. Before the rearrangement, the data size of the first part of each chapter content area 621 is 0.1 megabytes/second (bit rate)×10 seconds (startup time)×1.250 (safety coefficient)=1.25 megabytes (1310720 bytes) similarly to the above example about the step S12903 of the split arrangement program 129 (see FIG. 12). In the rearrangement into the spin down layer 520, the data size is changed to 0.5625 megabytes (589824 bytes) by the recalculation using "5 seconds" (instead of "10 seconds") as the startup time and "1.125" (instead of "1.250") as the safety coefficient.

In the next step S12209, the CPU 110 checks whether there exists a block for which the rearrangement has not been completed. If the file still includes a block that should be processed next (S12209: YES), the CPU 110 returns to the step S12207. If the file includes no next block (S12209: NO), the process advances to the step S12210.

In the step S12210, if an unprocessed row exists in the file read/write count management table 190, the CPU 110 returns to the step S12202 to execute the steps S12202 and S12210 for the next unprocessed row of the file read/write count management table 190. If no unprocessed row exists in the file read/write count management table 190, the process advances to step S12211.

In the step S12211, the CPU 110 updates the read/write count 193 to "0" in every row of the file read/write count management table 190. Thereafter, the CPU 110 returns to the step S12201, waits until the next rearrangement time comes, and thereafter repeats the above process.

In the file management method of this embodiment employed by the file server 100 capable of operating an on-line storage medium in a state in which reading or writing can be started immediately in response to a read request or write request for reading/writing a file (e.g. hard disk 210 in the on-line layer 510) and an off-line storage medium which has to be started up upon the occurrence of the read request or write request (e.g. hard disk 210, optical disk 310 or magnetic tape 410 in the off-line layer 580), a file is managed by split-arranging the file in the on-line storage medium and the off-line storage medium.

The startup time of the off-line storage medium (e.g. startup time 172 in the layer startup performance table 170) is prestored in the database 126 (storage unit) of the file server 100. The CPU 110 (processing unit) of the file server 100 receiving a write request for writing a stream file acquires bit rate information included in the stream file, calculates a splitting position of the file based on the acquired bit rate information and the startup time of the off-line storage medium, and executes split arrangement of the file by storing a first part as a part of the file (up to the splitting position) in the on-line storage medium while storing a second part as the remaining part of the file in the off-line storage medium based on the splitting position. The processing unit receiving a read request for reading out the stream file reads out the first part from the on-line storage medium while previously starting up the off-line storage medium storing the second part and reading out the second part from the off-line storage medium. With this embodiment, a lot of information in the stream file can be arranged or placed in the off-line storage medium, by which sufficient power-saving effect can be achieved.

In the file management method of this embodiment, the storage unit stores the file split arrangement necessity definition table 180 (file split arrangement necessity information) in which each filename extension is associated with information on whether the split arrangement of a file is necessary or not. The processing unit judges whether the split arrangement of the file received together with the write request is necessary or not by referring to the file split arrangement necessity information based on the filename extension of the file and executes the split arrangement of the file when the split arrangement is judged to be necessary.

In the file management method of this embodiment, the storage unit further stores the file split arrangement policy definition table 130 (file split arrangement layer information) in which each layer including one or more off-line storage media is associated with a read/write frequency range of a file which is permissible when the file is split-arranged into the layer and the layer startup performance table 170 (layer startup performance information) in which each layer is associated with the startup time of the storage media included in the layer. The processing unit determines a layer as a destination of rearrangement of the file based on the read/write frequency of the file, recalculates the splitting position of the file for the rearrangement of the file into the rearrangement destination layer based on the startup time of the storage media included in the rearrangement destination layer, and split-arranges the file again based on the result of the recalculation.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A file storage system, comprising:
a file server;
an on-line storage medium;
an off-line storage medium;
a storage unit which prestores at least a startup time of the off-line storage medium; and
a processing unit which is adapted to:
upon receiving a write request for writing a stream file, acquire bit rate information included in the stream file, calculate a splitting position of the file based on the acquired bit rate information and the startup time of the off-line storage medium, and execute split arrangement of the file by storing a first part as a part of the file in the on-line storage medium while storing a second part as a remaining part of the file in the off-line storage medium based on the splitting position; and
upon receiving a read request for reading out the stream file, read out the first part from the on-line storage medium and the second part from the off-line storage medium by starting up the off-line storage medium storing the second part.

2. The file storage system according to claim 1, wherein:
the storage unit stores file split arrangement necessity information in which each filename extension is associated with information on whether the split arrangement of a file is necessary or not, and the processing unit is further adapted to judge whether the split arrangement of the file received together with the write request is necessary or not by referring to the file split arrangement necessity information based on the filename extension of the file and executes the split arrangement of the file when the split arrangement is judged to be necessary.

3. The file storage system according to claim 1, wherein:
the file is a stream file including a meta data area and a content area, and the processing unit is further adapted to store the meta data area in the on-line storage medium.

4. The file storage system according to claim 1, wherein:
the file is a stream file including a meta data area and chapter content areas, and the processing unit is further adapted to calculate the splitting position individually for each chapter content area, and store a part of each chapter content area in the on-line storage medium based on the splitting position.

5. The file storage system according to claim 3, wherein:
the stream file further includes an index area for storing index information, and the processing unit is further adapted to store the index area in the on-line storage medium.

6. The file storage system according to claim 4, wherein:
the stream file further includes an index area for storing index information, and the processing unit is further adapted to store the index area in the on-line storage medium.

7. The file storage system according to claim 1, wherein:
the storage unit further stores file split arrangement layer information in which each layer including one or more off-line storage media is associated with a read/write frequency range of a file which is permissible when the file is split-arranged into the layer and layer startup performance information in which each layer is associated with the startup time of the storage media included in the layer, and the processing unit is further adapted to determine a layer as a destination of rearrangement of the stream file based on the read/write frequency of the stream file, recalculate the splitting position of the file for the rearrangement of the file into the rearrangement destination layer based on the startup time of the storage media included in the rearrangement destination layer, and split-arrange the file again based on the result of the recalculation.

8. The file storage system according to claim 7, wherein the file server operates a hard disk which is configured to be in a low revolution state in its standby state as the off-line storage medium.

9. The file storage system according to claim 7, wherein the processing unit is further adapted to control ON/OFF of power supply as power supply status of an entirety of a device including the off-line storage medium.

10. The file storage system according to claim 7, wherein the file server operates an optical disk as the off-line storage medium.

11. The file storage system according to claim 7, wherein the file server operates a magnetic tape as the off-line storage medium.

12. A file management method for a file storage system, which includes a file server, an on-line storage medium, and an off-line storage medium for managing a file by executing split arrangement of the file in the on-line storage medium and the off-line storage medium, wherein:
a startup time of the off-line storage medium is prestored in a storage unit of the file server, the method comprising the following steps performed by a processing unit of the file server:
upon receiving a write request for writing a stream file, acquiring bit rate information included in the stream file;
calculating a splitting position of the file based on the acquired bit rate information and the startup time of the off-line storage, medium; and
executing split arrangement of the file by storing a first part as a part of the file in the on-line storage medium while storing a second part as the remaining part of the file in the off-line storage medium based on the splitting position, and
upon receiving a read request for reading out the stream file, reading out the first part from the on-line storage medium and the second part from the off-line storage medium by starting up the off-line storage medium storing the second part.

13. The file management method according to claim 12, wherein the storage unit stores file split arrangement necessity information in which each filename extension is associated with information on whether the split arrangement of a file is necessary or not, the method further comprising the following steps performed by the processing unit:
- judging whether the split arrangement of the file received together with the write request is necessary or not by referring to the file split arrangement necessity information based on the filename extension of the file; and
- executing the split arrangement of the file when the split arrangement is judged to be necessary.

14. The file management method according to claim 12, wherein the storage unit further stores file split arrangement layer information in which each layer including one or more off-line storage media is associated with a read/write frequency range of a file which is permissible when the file is split-arranged into the layer and layer startup performance information in which each layer is associated with the startup time of the storage media included in the layer, and the method further comprising the following steps performed by the processing unit:
- determining a layer as a destination of rearrangement of the file based on the read/write frequency of the file;
- recalculating the splitting position of the file for the rearrangement of the file into the rearrangement destination layer based on the startup time of the storage media included in the rearrangement destination layer; and
- split-arranging the file again based on the result of the recalculation.

* * * * *